Figure 1:
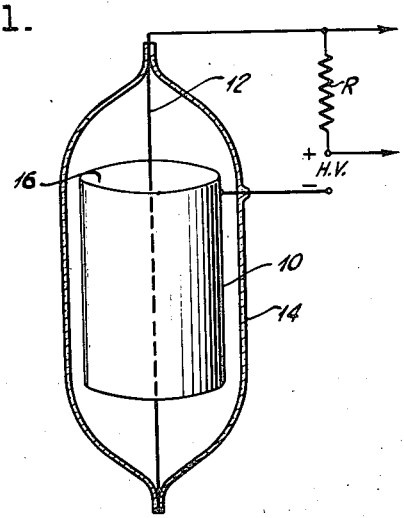

June 27, 1950 K. C. CRUMRINE 2,512,769
NEUTRON DETECTION
Filed Oct. 30, 1945

INVENTOR
K. C. CRUMRINE.
BY
ATTORNEY

Patented June 27, 1950

2,512,769

UNITED STATES PATENT OFFICE 2,512,769

NEUTRON DETECTION

Kenneth C. Crumrine, Bellaire, Tex., assignor to The Texas Company, New York, N. Y., a corporation of Delaware Application October 30, 1945, Serial No. 625,597

5 Claims. (Cl. 250—27.5)

This invention relates to the detection of penetrative radiation and more particularly to a neutron detecting device and a method of making such a device. The principal object of the invention is to provide a neutron detector which has a higher efficiency for detecting slow neutrons and which has a lower efficiency for detecting other radiation, especially gamma rays, than neutron detectors heretofore available and having comparable dimensions, operating voltage and durability.

Of the three forms of radiation detecting devices, namely Geiger-Mueller counters, ionization chambers and proportional counters, the last named has proven to be very suitable for detecting neutrons. In my copending application Serial No. 511,516, filed November 24, 1943, now U. S. Letters Patent No. 2,462,471, granted February 22, 1949, a proportional counter is disclosed which is very sensitive to neutrons and which is insensitive to gamma radiation. The said application clearly describes the different characteristics of the three types of radiation detectors.

In the copending application of Gerhard Herzog and myself, Serial No. 511,990, filed November 27, 1943, now U. S. Letters Patent No. 2,443,731 granted June 22, 1948, other forms of proportional counters are disclosed in connection with neutron well logging.

A neutron detector or proportional counter usually comprises a housing adapted to be sealed and containing a cathode, an anode and a gas filling. Since neutrons do not ionize, it is necessary in order to detect them, to use an intermediate reaction by which the neutrons release ionizing particles which in turn act on the gas of the proportional counter. Such reactions are known to occur with lithium and boron, for example. A proportional counter can either be filled with gas (such as boron trifluoride) which contains a compound of one of these elements, or the surface of the cathode can be lined with one of the elements or its compounds, or a combination of both procedures can be used. In these reactions the neutrons in interaction with atoms of the neutron reactive substance release alpha particles and these alpha particles cause ionization of the gas filling within the detector. Of the two procedures mentioned, it has been found that the coating of the cathode with a layer of the neutron reactive substance is more satisfactory than the use of a neutron reactive gas since, with the "coating" method the resulting detector has a higher efficiency for detecting slow neutrons than the gas-filled detector of comparable dimensions, operating voltage, etc.

A solid, smooth layer of a neutron reactive substance such as boron or one of its compounds could be used as a lining for the detector cathode. Such a layer would present a smooth surface to the gas to be ionized and while detectors of this type have been used with some success, I have found that by providing a cathode coating of a substance such as boron carbide in which the alpha particle emitting surface is uneven or saw-toothed in cross section rather than smooth, the surface area from which the alpha particles are emitted can be made several times as great as the area of the cathode on which the layer is placed. Consequently, there is a much greater chance for alpha particles to be emitted than were the surface smooth.

In carrying out the invention in one form, boron carbide in the form of powder in which the grain size may vary up to three mils is mixed with an adhesive, preferably a synthetic resin type cement such as Duco cement which is thinned with acetone and its drying speed suitably retarded by a small and controllable amount of amyl acetate. In the following discussion, where "minute" particles are mentioned, particles or powder having a grain size of up to 3 mils and averaging about 1 mil are intended. The boron carbide powder in the adhesive binder is then sprayed onto the inner surface of the metal cathode sheet which may be in the form of a cylinder. During the spraying operation the coating is intermittently observed by means of a microscope and after the desired average thickness, preferably about one mil, has been obtained and the adhesive dried, the cathode is ready to be placed in the detector housing. In another embodiment a layer of the adhesive may be placed on the cathode surface either by spraying, dipping or wiping it on and then the dry powder comprising the neutron reactive substance sprayed or dusted onto the adhesive.

Figure 2:
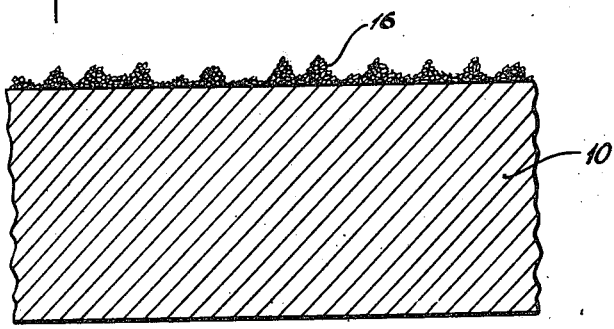
Figure 3:
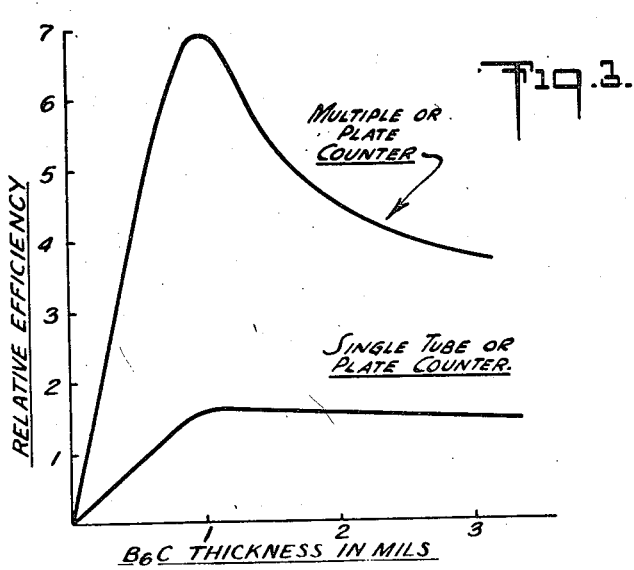

For a better understanding of the invention reference may be had to the accompanying drawing in which:

Figure 1 is a vertical sectional elevation through a simple form of neutron detector or proportional counter, Figure 2 is a greatly enlarged cross section showing the neutron reactive coating or layer on a portion of the cathode, and Figure 3 is a curve showing how the efficiency of the detector varies with the thickness of the layer.

In the detector as illustrated in Figure 1 a cathode 10 and an anode 12 are mounted within a housing 14 which may be a glass envelope or a container of brass, aluminum or the like. If glass is used, one should be certain that it contains no compound of boron or lithium. The cathode 10 as shown is in the form of a thin walled cylinder which may be formed of a sheet of brass or any other suitable metal and the anode 12 is in the form of a fine wire, preferably of tungsten and about three mils in diameter, stretched coaxially through the cathode and secured at its ends. As shown in Figure 1 the anode is maintained at a positive potential with respect to the cathode and a fairly high resistance R is connected in series with the electrodes and a source of high potential. It has been found that for a proportional counter of this type a potential difference of the order of 1000 volts is satisfactory. The inner surface 16 of the cathode cylinder 10 is coated with boron carbide preferably as described hereinbefore, e. g., by spraying boron carbide particles or powder in an adhesive binder onto the surface until an average thickness of about one mil has been obtained. The housing or envelope 14 is filled with a gas and while various gases are more or less satisfactory, methane under a pressure of about two inches of mercury has been found suitable.

A neutron in penetrating the cathode cylinder 10 and the neutron reactive coating 16 may release an alpha particle due to the nuclear reaction and this particle may then cause ionization of the gas, thus producing a discharge or pulse in the detector. A voltage pulse across the resistance R due to the detector discharge is thus produced and the average number of such pulses per unit time is measured or recorded by any suitable means and in this manner the intensity of the neutrons in the vicinity of the detector can be determined.

The range of the alpha particles in a solid uniform coating of boron carbide is approximately ⅛ mil and theoretically it is therefore of no advantage to provide a uniform coating thicker than this amount because alpha particles from a depth greater than ⅛ mil will be absorbed within the layer and could not enter the gas of the counter and produce ionization. On the other hand, an increase in thickness of the boron coating over this amount is generally not harmful since the absorption of neutrons in the coating is very small. However, in case a multiple counter is used, i. e., one in which a plurality of cathodes and anodes are disposed within a single housing such as is described, for instance, in the aforementioned application, Serial No. 511,990, a neutron may have to pass through several cathodes with their coatings and the absorption of the neutrons may then become appreciable.

In the discussion in the foregoing paragraph it was assumed that the boron carbide coating was in the form of a solid uniform layer. It has been found that where boron carbide powder or particles are sprayed onto a smooth surface, the resulting surface of the boron carbide in contact with the gas filling is not smooth but when viewed in the microscope is quite rough and saw-toothed in cross section. Due to this unevenness it has been estimated that the alpha particle emitting surface is as much as three times as large as the surface of the metal cathode onto which the powder is sprayed. This means of course that a relatively large surface of the neutron reactive substance is presented to the gas and while the thickness of the coating may vary from a very small amount to as much as three mils in spots where the particles have piled up on each other during the spraying, there is no appreciable loss due to absorption in the coating. This naturally increases the efficiency of the device for the detection of neutrons.

In Figure 2 an enlarged cross section of a portion of the cathode 10 is shown, the coating of the boron carbide 16 being disposed on the surface of the cathode so that the surface of the coating in contact with the gas filling will be relatively large.

Figure 3 is a curve showing the efficiency of neutron detectors in which the cathode is provided with a coating or layer of boron carbide. The lower curve is characteristic for a counter which has a single tube or plate as the cathode whereas the upper curve represents a counter having a plurality of cathode tubes or plates. It will be noted that the efficiency for the single tube counter increases with increasing boron carbide thickness and that it then drops off slowly. The curve for the multiple tube counter shows a sharper increase and then a rather pronounced drop, this drop being caused by the increase in absorption of the neutron beam by the layer or layers of boron carbide. For a single tube counter this absorption is not too important because the part of the neutron beam which is not used by the one cathode is lost as far as the measurement is concerned. With a multiple tube counter it is important that the neutron beam not be weakened more than necessary in the first cathode so that the following cathodes will receive as high a neutron intensity as possible, as has been brought out in a previous paragraph. It will be noted that the efficiency of either the single or multi-tube counter does not continue to increase with increasing thickness of the boron but on the contrary, reaches a peak and then falls off. It has been found that a boron carbide coating which averages one mil in thickness is quite satisfactory.

The following method has been found suitable for applying the coating to the detector cathode. The tube or cathode cylinder is mounted in the chuck of a lathe and around the end of the cylinder and coaxial therewith is wrapped a small, thin strip of transparent plastic which projects beyond the end of the cathode cylinder. A spray gun is mounted so as to enter the rotating cylinder and plastic test strip and to spray a jet of the boron carbide particles and adhesive onto their inner surface. After the spray gun has made a few passes in and out of the rotating cylinder, the machine is stopped, the test strip removed and a cross section of the coating observed under a microscope in comparison with a standard. In this manner the desired thickness of the coating can be quite easily obtained.

Instead of mixing the boron carbide powder with the adhesive and then spraying the mixture onto the cathode surface, the cathode may be coated in any suitable manner with the adhesive and then while the adhesive is wet or tacky, the coating sprayed or dusted with the dry powder. This method has the advantage that the individual boron carbide particles are not covered with a layer of the binder or adhesive which layer, of course, absorbs some of the alpha particles which are emitted under the action of the neutrons.

Although boron carbide has been referred to as the preferred cathode-coating material, other substances such as for example boron, lithium and the like can be used if desired.

While the cathode itself has been described as formed of a solid sheet of a suitable metal, it is to be understood that it may be formed of perforated or expanded metal, metal gauze or the like and it may also, of course, take other forms than that of a flat plate or a cylinder.

Although the detector or counter has been described as having a cylindrical cathode, it is to be understood that the invention also contemplates the use of cathodes of other forms such as a plurality of slightly separated parallel discs or plates containing holes through which one or more anode wires are stretched. A gamma radiation detector constructed in this manner is disclosed in the U. S. Letters Patent of D. G. C. Hare, No. 2,397,071, granted March 19, 1946. In another form the anode wires may be disposed between and parallel to the separated, flat cathode plates. A gamma ray detector of this type is shown in the U. S. Letters Patent of D. G. C. Hare and Gerhard Herzog, No. 2,397,074, granted March 19, 1946.

Obviously many modifications and variations of the invention, as hereinbefore set forth, may be made without departing from the spirit and scope thereof and, therefore, only such limitations should be imposed as are indicated in the appended claims.

I claim:

1. In a neutron detector, a housing, a wire anode, a cathode and a gas in said housing, said cathode comprising a sheet-like metal member having a coating on at least part of its surface of a substance capable, when bombarded by neutrons, of ejecting alpha particles to ionize said gas, said coating being composed of minute particles of said substance in an adhesive binder and having a surface area several times the area of the coated portion of said member, said particles averaging 1 mil in grain size.

2. In a neutron detector, a housing, a wire anode, a cathode and a gas in said housing, said cathode comprising a sheet-like metal member having a coating on at least part of its surface of particles of boron carbide in an adhesive binder, said particles averaging one mil in grain size.

3. In a neutron detector, a housing, a wire anode, a cathode and a gas in said housing, said cathode comprising a sheet-like metal member having a coating on at least part of its surface of particles of boron carbide in an adhesive binder, said particles averaging one mil in grain size, and said coating having an average thickness of from one-tenth mil to three mils.

4. In a neutron detector a housing, a wire anode, a cathode and a gas in said housing, said cathode comprising a sheet-like metal member having a coating on at least part of its surface of particles of boron carbide, said coating having an exposed surface which in cross section will present myriads of fine peaks and valleys.

5. In a neutron detector a housing, a wire anode, a cathode and a gas in said housing, said cathode comprising a sheet-like metal member having a coating on at least part of its surface of a substance capable, when bombarded by neutrons, of ejecting alpha particles to ionize said gas, the exposed surface of said coating appearing substantially uniform and smooth to the naked eye but in cross section under the microscope appearing rough, having myriads of minute peaks and valleys.

KENNETH C. CRUMRINE.

REFERENCES CITED

The following references are of record in the file of this patent:

UNITED STATES PATENTS

| Number | Name | Date |
|---|---|---|
| 2,220,509 | Brons | Nov. 5, 1940 |
| 2,233,917 | DeBoer et al. | Mar. 4, 1941 |
| 2,250,189 | Bachman | July 22, 1941 |
| 2,288,718 | Kallmann et al. | July 7, 1942 |
| 2,368,060 | Wooten | Jan. 23, 1945 |
| 2,440,167 | Broxon et al. | Apr. 20, 1948 |